US006892008B2

(12) United States Patent
Singh et al.

(10) Patent No.: US 6,892,008 B2
(45) Date of Patent: May 10, 2005

(54) PLANAR STAR COUPLERS WITH REDUCED INSERTION LOSS

(75) Inventors: Harmeet Singh, Acton, MA (US); Hamid R. Khazaei, Westford, MA (US)

(73) Assignee: Optovia Corporation, Acton, MA (US)

(*) Notice: Subject to any disclaimer, the term of this patent is extended or adjusted under 35 U.S.C. 154(b) by 160 days.

(21) Appl. No.: 10/367,208

(22) Filed: Feb. 14, 2003

(65) Prior Publication Data

US 2004/0161200 A1 Aug. 19, 2004

(51) Int. Cl.$^7$ ................................................ G02B 6/30
(52) U.S. Cl. ........................................ 385/49; 385/39
(58) Field of Search ..................... 385/14, 31, 39–49

(56) References Cited

U.S. PATENT DOCUMENTS

| | | | | | |
|---|---|---|---|---|---|
| 5,706,377 | A | * | 1/1998 | Li | 385/37 |
| 5,926,298 | A | * | 7/1999 | Li | 385/24 |
| 6,049,640 | A | * | 4/2000 | Doerr | 385/15 |
| 6,289,147 | B1 | * | 9/2001 | Bulthuis et al. | 385/24 |

OTHER PUBLICATIONS

Hiroshi Takahashi et al., "Transmission Characteristics of Arrayed Waveguide, NxN Wavelength Multiplexer", Journal of Lightwave Technology, vol. 13, No. 3, Mar. 1995, pp. 447–455.

J. C. Chen et al., "A Proposed Design for Ultralow–Loss Waveguide Grating Routers", IEEE Photonics Technology Letters, vol. 10, No. 3, Mar. 1998, pp. 379–381.

C. Van Dam et al., "Loss reduction for phased–array demultiplexers using a double etch technique", Integrated Photonics Research IPR '96, Apr. 29–May 2, 1996, Boston, Ma. Technical Digest, vol. 6, pp. 52–55.

M. Park et al., "Design of Waveguide–Grating Routers with Minimal Insertion Loss over All Channels Based on Coupling between Adjacent Waveguides", *CLOE 2001*, pp. 127–128.

* cited by examiner

*Primary Examiner*—Ellen E. Kim
(74) *Attorney, Agent, or Firm*—Erwin W. Pfeifle; Irwin Ostroff (57) ABSTRACT

In a star coupler, a Free Propagation Region (FPR) is bounded by a first interface and a second opposing interface, and guides an input signal launched from the first interface in a predetermined first plane while allowing the input signal to travel unguided in a predetermined second plane in the FPR which is orthogonal to the first plane. A plurality of output waveguides are formed in an array and terminate at the second interface of the FPR. The axis of each output waveguide at the second interface is separated from an axis of an adjacent output waveguide by a predetermined distance "t". An input waveguide is split into a plurality of subsections which each terminate at the first interface of the FPR. The subsections of the input waveguide are arranged for simultaneously launching parts of the input signal into the FPR which diffracts and produces mode patterns at the second interface having a maximum intensity at inputs of each of the output waveguides, and a low intensity elsewhere.

22 Claims, 6 Drawing Sheets

PLANAR STAR COUPLERS WITH REDUCED INSERTION LOSS

FIELD OF THE INVENTION

The present invention relates to method and apparatus for providing reduced insertion loss in planar star couplers.

BACKGROUND OF THE INVENTION

Figure 1:
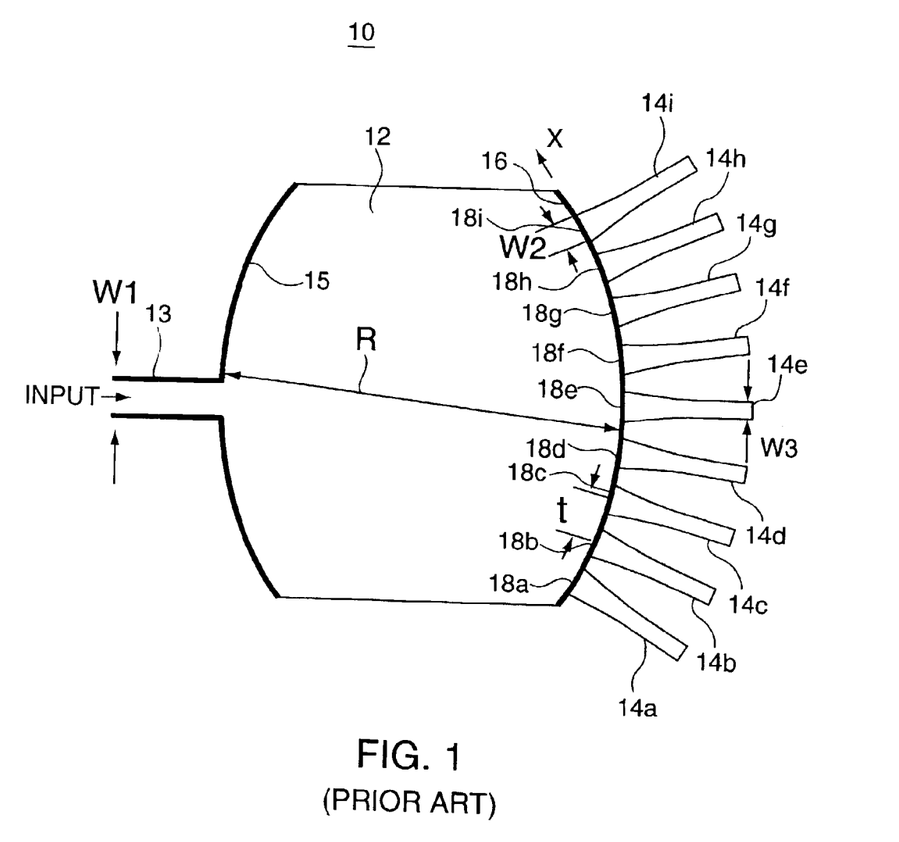
FIG. 1 is an arrangement of an exemplary prior art planar star coupler with one input waveguide and a plurality of output waveguides.

Referring now to FIG. 1, there is shown a exemplary prior art planar star coupler 10 (or one input-to-n output signal coupler) comprising a Free Propagation Region (FPR) 12, an input waveguide 13, and a plurality of "i" output waveguides 14a–14i for use with lightwave transmission. The FPR 12 comprises a first interface 15 having a partial cylindrical shape on which an output of the input waveguide 13 is terminated, and a second opposing interface 16 having a partial cylindrical shape. The second opposing interface 16 has a radius related to that of the first interface and is spaced apart at a distance R from the first interface 15. The second opposing interface 16 terminates the inputs to the plurality of "i" output waveguides 14a–14i. Inputs 18a–18i to the plurality of "i" waveguides 14a–14i, respectively, have their axis spaced apart from the axis of any one of the adjacent output waveguides 14a–14i by a distance "t". The input waveguide 13 has a width W1, and an input of each one of the output waveguides 14a–14i has a width W2 at the second interface 16, and then tapers to a width W3.

The FPR 12 of the planar star coupler 10 is essentially a slab waveguide, and tends to guide light in a vertical plane (in a direction out of the paper in FIG. 1) but allows light to travel unguided in the horizontal plane (in the plane of the paper of FIG. 1). In operation, an optical signal is launched into the input of the waveguide 13 and propagates in the input waveguide 13 to the output at the first interface 15 of the FPR 12. Upon entering the FPR 12, the optical signal diffracts freely in the horizontal plane. As the light reaches the second interface 16, each of the output waveguides 14a–14i is placed to accept a portion of light incident upon its input 18a–18i, respectively. The fraction of light that overlaps the inputs 18a–18i of the waveguides 14a–14i, respectively, then gets coupled into the respective waveguides 14a–14i. The light pattern at the second interface 16 can be defined as a Fourier transform of the light pattern at the input waveguide 13.

Figure 2:
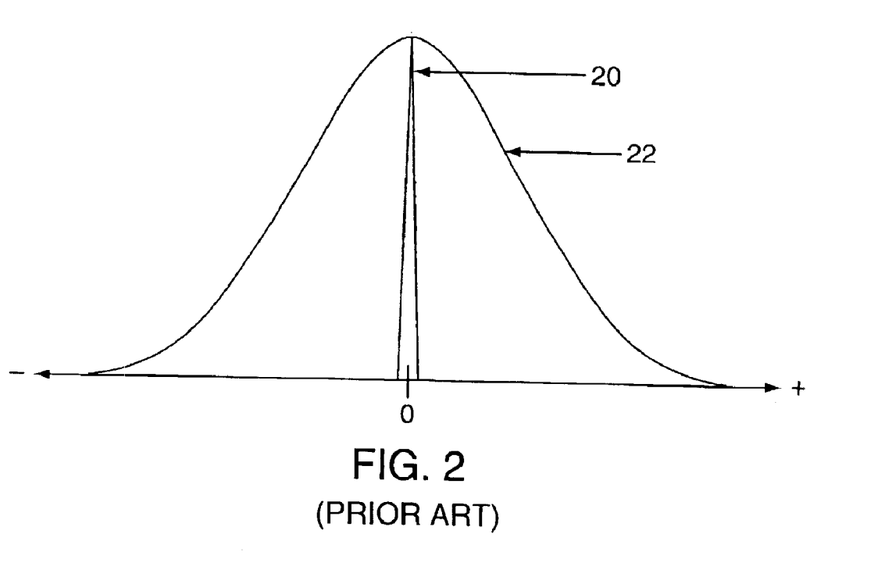
FIG. 2 illustrates mode profiles of an input signal at first and second interfaces, respectively, of the planar star coupler of FIG. 1.

Referring now to FIG. 2, there is shown a mode profile 20 of an input signal at the first interface 15 of the FPR 12, and a mode profile 22 at the second interface 16 of the star coupler 10 of FIG. 1. In a conventional waveguide, the mode profile is nominally Gaussian shaped and, accordingly, the diffracted pattern has a nominal Gaussian profile as is shown for the mode profiles 20 and 22.

Figure 3:
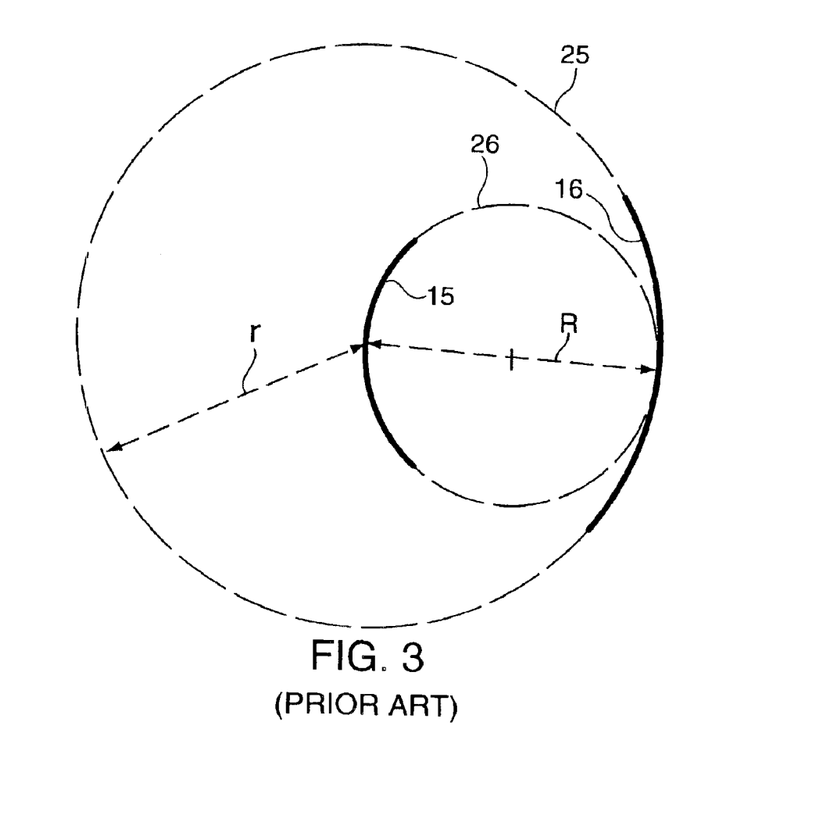
FIG. 3 shows a diagram of a first circle 25 and a second inner circle 26, called the Rowland circles, which illustrate the technique of forming the FPR 12 of FIG. 1.

Referring now to FIG. 3, there is shown a diagram of a first circle 25 and a second inner circle 26, called the Rowland circles, which illustrate the technique of forming the FPR 12 of FIG. 1. The first circle 25 has a radius r, where a portion of the circumference thereof forms the arc of the second interface 16 of the FPR 12. The second inner circle 26 has a diameter R which may or may not (depending on the design) intersect the center and the circumference of the first circle where the second interface 16 is located as is shown in FIG. 3. A portion of the circumference of the second inner circle 26 opposite the second interface 16 forms the arc of the first interface 15 of the FPR 12.

Figure 4:
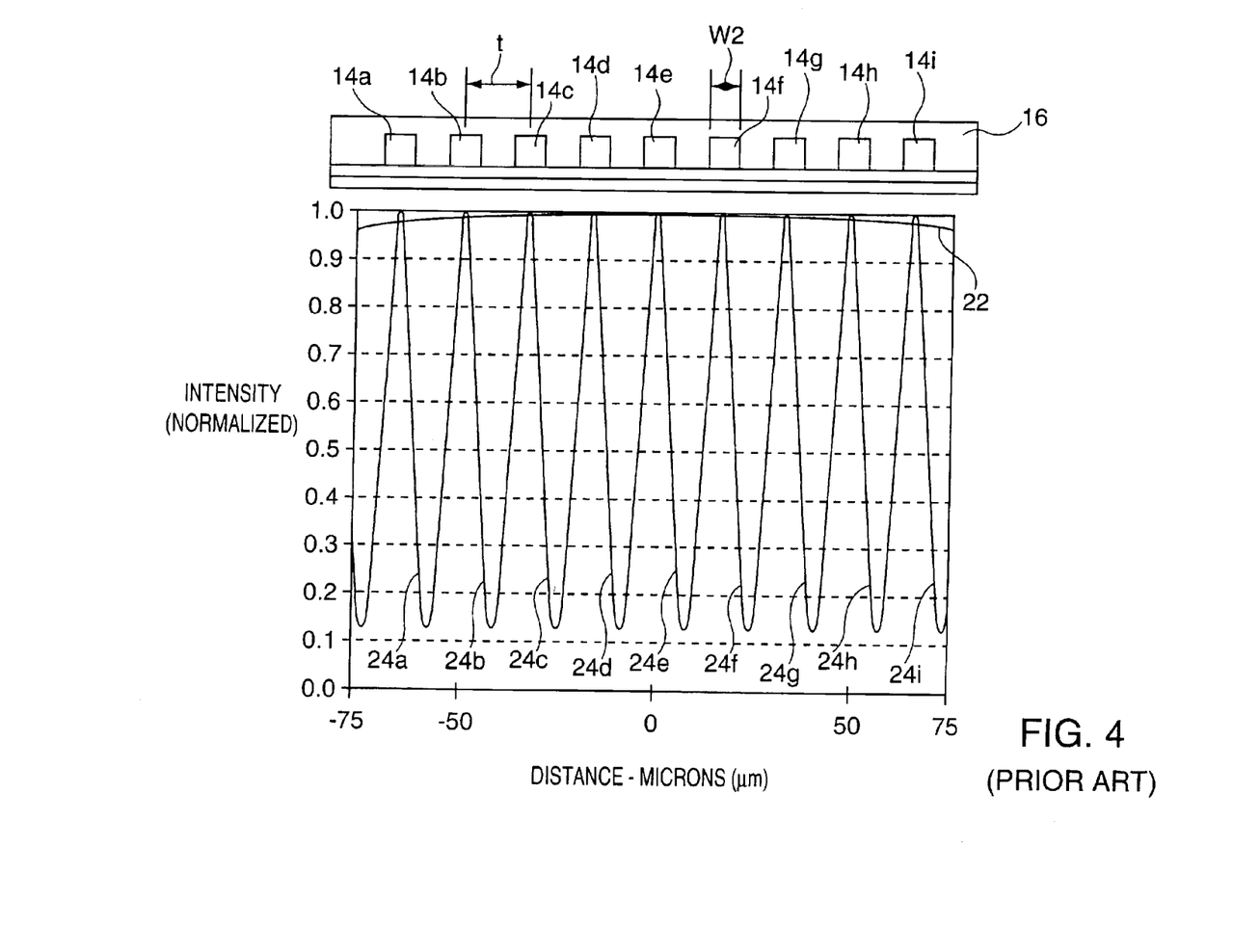
FIG. 4 shows a function of the far field diffraction pattern found at the second interface, and periodic mode profiles of light at inputs of arrayed output waveguides at the second interface of the prior art star coupler of FIG. 1.

Referring now to FIG. 4, there is shown a function of a mode profile 22 (shown in FIG. 2) of light found at the second interface 16 of the star coupler 10 of FIG. 1, and periodic mode profiles 24a–24i of light at the inputs 18a–18i of the output waveguides 14a–14i, respectively, at the second interface 16 of the FPR 12 of FIG. 1. The X axis is shown in units of microns, whereas the Y axis is shown in normalized values of intensity. With the mode profiles 24a–24i, the light incident on the portion of the second interface 16 where there is no input to any one of the waveguides 14a–14i is not coupled and is lost by reflection and leakage and, therefore, produces an insertion loss.

It is desirable to provide a planar star coupler with a reduced insertion loss from that found in prior art star couplers.

SUMMARY OF THE INVENTION

The present invention is directed to method and apparatus for providing reduced insertion loss in planar star couplers from that found in conventional star couplers.

From a first apparatus aspect, the present invention is a one-to-n signal coupler comprising a Free Propagation Region (FPR). The FPR comprises edge interfaces which define at least two input ports which terminate at least two separate subsections from a single input waveguide, and a plurality of n output ports which provide inputs to a plurality of n output waveguides, respectively, where n is an integer greater than 1. Each of the n output ports are separated from each other and intersect different areas of a second portion of the edge interfaces defining the FPR. The at least two input ports intersect a first portion of the edge interfaces opposite the second portion thereof and are separated by a predetermined distance from each other. When portions of an input signal are launched into the FPR from each of the at least first and second input ports, the signal diffracts in the FPR to generate a high intensity signal at each of the n output ports and a low intensity signal elsewhere.

From a second apparatus aspect, the present invention is a star coupler comprising a Free Propagation Region (FPR), a plurality of n output waveguides, and an input waveguide. The FPR comprises a first interface and a second opposing interface for guiding an input signal launched from the first interface in a predetermined first plane while allowing an input signal to travel unguided in a predetermined second plane in the FPR which is orthogonal to the first plane. The plurality of n output waveguides are formed in an array which terminate at the second interface of the FPR where an axis of each output waveguide is separated from an axis of an adjacent output waveguide by a predetermined distance "t". The input waveguide is split into a plurality of subsections which each terminate at the first interface of the FPR. The input waveguide is arranged for simultaneously launching parts of the input signal into the FPR from the plurality of subsections that produce mode patterns at the second interface having a maximum intensity at inputs of each of the n output waveguides and having a low intensity elsewhere.

From a third apparatus aspect, the present invention is a planar star coupler comprising a Free Propagation Region (FPR), a plurality of n output waveguides, and an input waveguide. The FPR comprises a first interface and a second opposing interface for guiding an input signal launched from the first interface in a predetermined first plane while allowing the input signal to travel unguided in a predetermined second plane in the FPR which is orthogonal to the first plane. The plurality of n output waveguides are formed in an array which terminate at the second interface of the FPR. The axis of each output waveguide at the second interface is separated from an axis of an adjacent output waveguide by a predetermined distance "t". The input waveguide is split into at least first and second subsections which terminate at the first interface of the FPR. The input waveguide is arranged for simultaneously launching parts of the input signal into the FPR from the at least first and second subsections that produce mode patterns at the second interface having a maximum intensity at inputs of each of the output waveguides and having a low intensity elsewhere.

From a fourth apparatus aspect, the present invention is a one-to-n coupler comprising a housing member, an input port, and a plurality of n separated output ports. The housing member has walls which enclose a Free Propagation Region (FPR) and define the input port and the plurality of n separated output ports. The input port comprises at least two separated input waveguide channels which couple the input port into predetermined different areas of a first portion of the walls of the housing member. The plurality of n output ports are separated from each other and intersect different areas of a second portion of the walls. The first and second portions of the walls are located opposite each other such that, with a signal introduced at the input port, essentially signals enter the FPR from the at least two input waveguide channels and generate at each of the n output ports a high intensity signal and a low intensity signal elsewhere.

From a method aspect, the present invention is a method of transmitting a single input signal to n output ports in a star coupler. In the method, portions of the single input signal are concurrently transmitted from at least two input ports into a Free Propagating Region (FPR) of the star coupler. In the FPR, each of the portions of the input signal are caused to diffract such that each of the n output ports receives a high intensity signal and a low intensity signal is received elsewhere.

The invention will be better understood from the following more detailed description taken with the accompanying drawings and claims.

The drawings are not necessarily to scale.

DETAILED DESCRIPTION OF THE INVENTION

Figure 5:
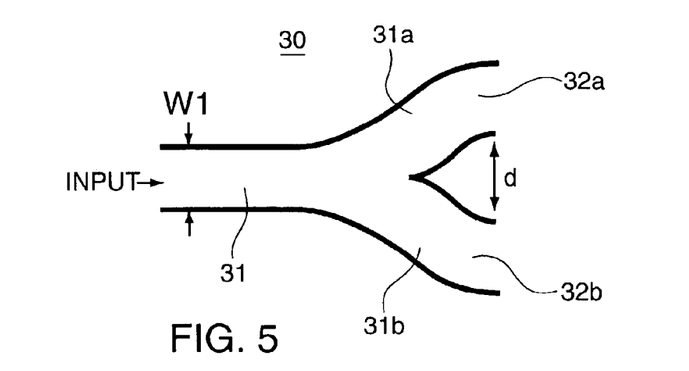
FIG. 5 shows a cross-sectional view of an input waveguide for use in an exemplary planar optical star coupler in accordance with the present invention.

Referring now to FIG. 5, there is shown a view of an input waveguide 30 for use in an exemplary planar optical star coupler (e.g., the planar star coupler 10 of FIG. 1) in accordance with the present invention. The input waveguide 30 comprises a width W1 for propagating an input signal along a section 31, and splits into a first subsection 31a terminating at a first output port 32a, and a second subsection 31b terminating at second output port 32b which are spaced apart by a predetermined distance "d" at ports 32a and 32b. In operation, an input signal propagating in section 31 is divided into first and second parts which propagate along subsections 31a and 31b and are launched from the first and second output ports 32a and 32b, respectively. Although only first and second ports 32a and 32b are shown for purposes of simplicity, it is to be understood that the input waveguide 30 can comprise more than two waveguide subsections and associated output ports (not shown). The splitting of input waveguide 31 to a plurality of waveguides can be made using different methods such as Y-junctions, directional couplers, multimode interference (MMI), etc.

Figure 6:
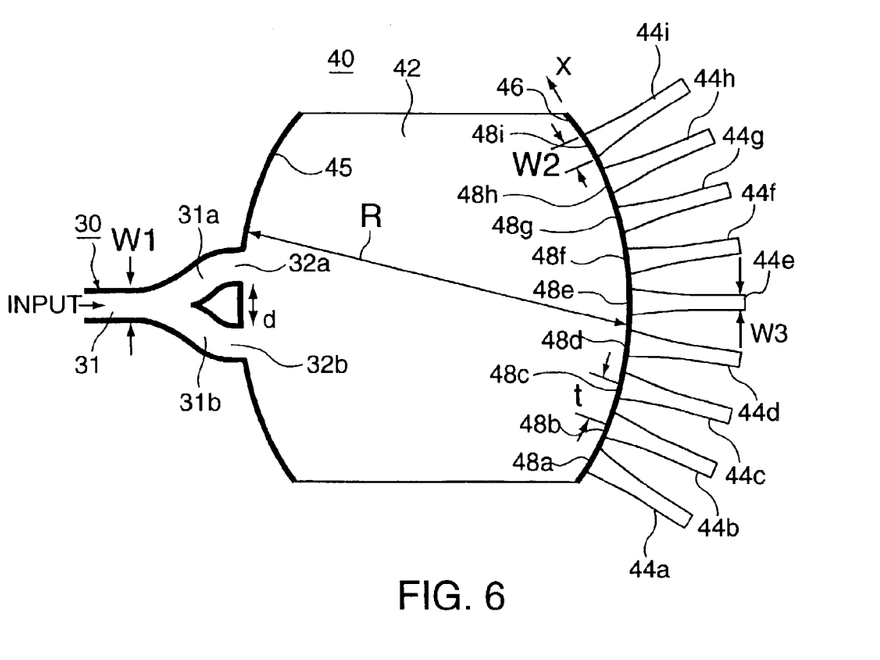
FIG. 6 shows an exemplary planar optical star coupler including the input waveguide of FIG. 4 in accordance with the present invention.

Referring now to FIG. 6, there is shown a cross-sectional view of an exemplary planar optical star coupler 40 comprising the input waveguide 30 of FIG. 5 in accordance with the present invention. The star coupler 40 comprises a Free Propagation Region (FPR) 42, the input waveguide 30, and a plurality of "i" output waveguides 44a to 44i. The FPR 42 comprises a first interface 45 having a partial cylindrical shape on which the output of the input waveguide 30 is located, and a second opposing interface 46 having a partial cylindrical shape. The second opposing cylindrical interface 46 has a corresponding radius to that of the first cylindrical interface 45 and is spaced apart at a radial distance R from the first interface 45. The second opposing interface 46 includes inputs 48a–48i with one input being in communication with one of the plurality of i output waveguides 44a–44i, and with the centers of the inputs 48a–48i being spaced apart by a distance "t". The inputs 48a–48i each have a width W2, and the output of each of the waveguides 44a–44i then tapers to a width W3. This taper is not necessary, but a general engineering practice is to reduce loss by including the taper in the conventional devices as are presently made. A main portion of the coupler 40 may be considered a housing member having walls 45 and 46 which define the input ports 32a and 32b from input channels 31a and 31b, n separated output ports 48a–48i, and the FPR 42.

The FPR 42 of the star coupler 40 is essentially a slab waveguide, and tends to guide light in a vertical plane (in a direction out of the paper in FIG. 6) but allows light to travel unguided in the horizontal plane (in the plane of the paper of FIG. 6). In operation, an optical signal propagating in the input waveguide 30 is divided into two parts and propagates to the first and second ports 32a and 32b at the first interface 45 of the FPR 42. Upon entering the FPR 42, the optical signal diffracts freely in the horizontal plane. As the light reaches the second interface 46, each of the output waveguides 44a–44i is positioned to accept a portion of light incident upon its input 48a–48i, respectively. The fraction of light that overlaps the inputs 48a–48i of each of the waveguides waveguide 44a–44i then gets coupled into the respective waveguide 44a–44i. The light pattern at the second interface 46 can be defined as a Fourier transform of the light pattern launched by output ports 32a and 32b of the input waveguide 30.

In accordance with the present invention, a mechanism is provided where the light pattern incident on the second interface 46 is modified to match the mode profile of the array of output waveguides 44a–44i such that the intensity of the launched light is maximum at the inputs 48a–48i of the waveguides 44a–44i, respectively, and a low intensity at locations where a waveguide 44a–44i is absent. This objective is achieved by the splitting of the input waveguide 30 into the two separate waveguides (channels) in a way that the light is launched into the FPR 42 from more than one source (output ports 32a and 32b). As the light from the two adjacent ports 32a and 32b diffracts and arrives at the second interface 46, the light from each of the ports 32a and 32b interfere with each other and form an interference pattern. By designing the separation "d" of ports 32a and 32b of the input waveguide 30, it is possible to construct an interference pattern at the second interface 46 to match the mode profile of the output waveguides 44a–44i. As will be clear from the below discussion, this results in a substantial reduction of the insertion loss from that obtained by the conventional planar start coupler 10 shown in FIG. 1.

The intensity of the light along the second interface 46 of the star coupler 40 is proportional to $\cos^2(\delta/2)$, where $\delta=(2\pi n x d)/(\lambda R)$, where n is the index of refraction for the FPR 42, x is the distance along the arc of the second interface 46, d is the distance between the input ports 32a and 32b, and R is the diameter of the outer of two circles called the Rowland circles forming the FPR 42 as is shown in FIG. 3. The light interference pattern maxima and minima are obtained when $(\delta/2)=m\pi$ which yields maxima of $x=(mR\lambda)/(nd)$ where $|m|=0, 1, 2 \ldots$, and minima of $x=(mR\lambda)/(nd)$ where $m=\frac{1}{2}, \frac{3}{2}, \frac{5}{2}\ldots$. To ensure that light maxima are aligned with the output waveguides 44a–44i, it is necessary to ensure that periodicity of interference pattern matches that of output waveguide profiles 24a–24i, $t=(mR\lambda)/(nd)$, and the phase difference between two coherent sources at 32a and 32b interfaces is adjusted accordingly. Exemplary values for the start coupler 40 of FIG. 6 are $t=16.5\ \mu m$, $R=5\ mm$, $d=300\ \mu m$, $\lambda=1.55\ \mu m$, and $n=1.55$.

Figure 7:
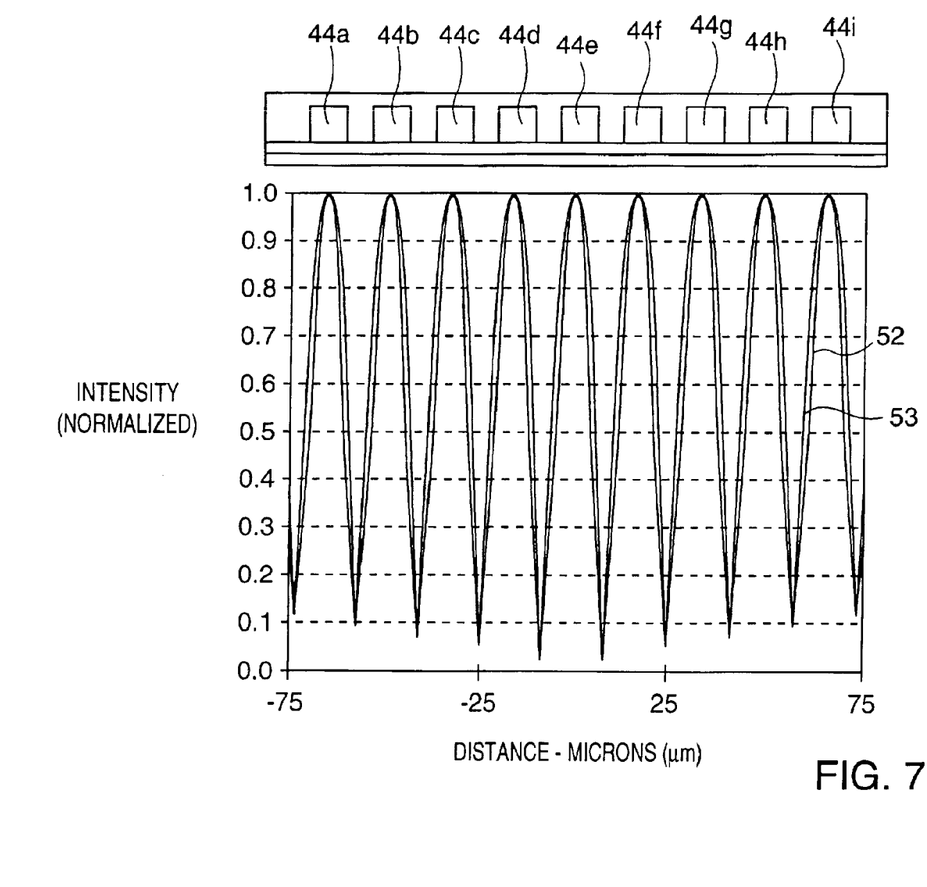
FIG. 7 shows enlarged mode profiles of the far field diffraction pattern two coherent in-phase input signals in a Free Propagating Region (FPR) and periodic mode profiles of arrayed output waveguides in the star coupler of FIG. 6 in accordance with the present invention.

Referring now to FIG. 7, there are shown an enlarged periodic mode profile 52 of the arrayed output waveguides 44a–44i in the star coupler 40 of FIG. 6, and an enlarged mode profile 53 of the far field diffraction pattern of two coherent in-phase input signals from input port 32a and 32b in the Free Propagation Region 42 of FIG. 6 in accordance with the present invention. FIG. 7 displays a same information to that shown in FIG. 4 for the conventional star coupler 10 of FIG. 1. The overlap between mode profiles 52 and 53 for the present star coupler 40 with two input ports 32a and 32b is larger than the overlap between mode profiles 20 and 24a–24i with the one input port 13 of FIG. 4.

Figure 8:
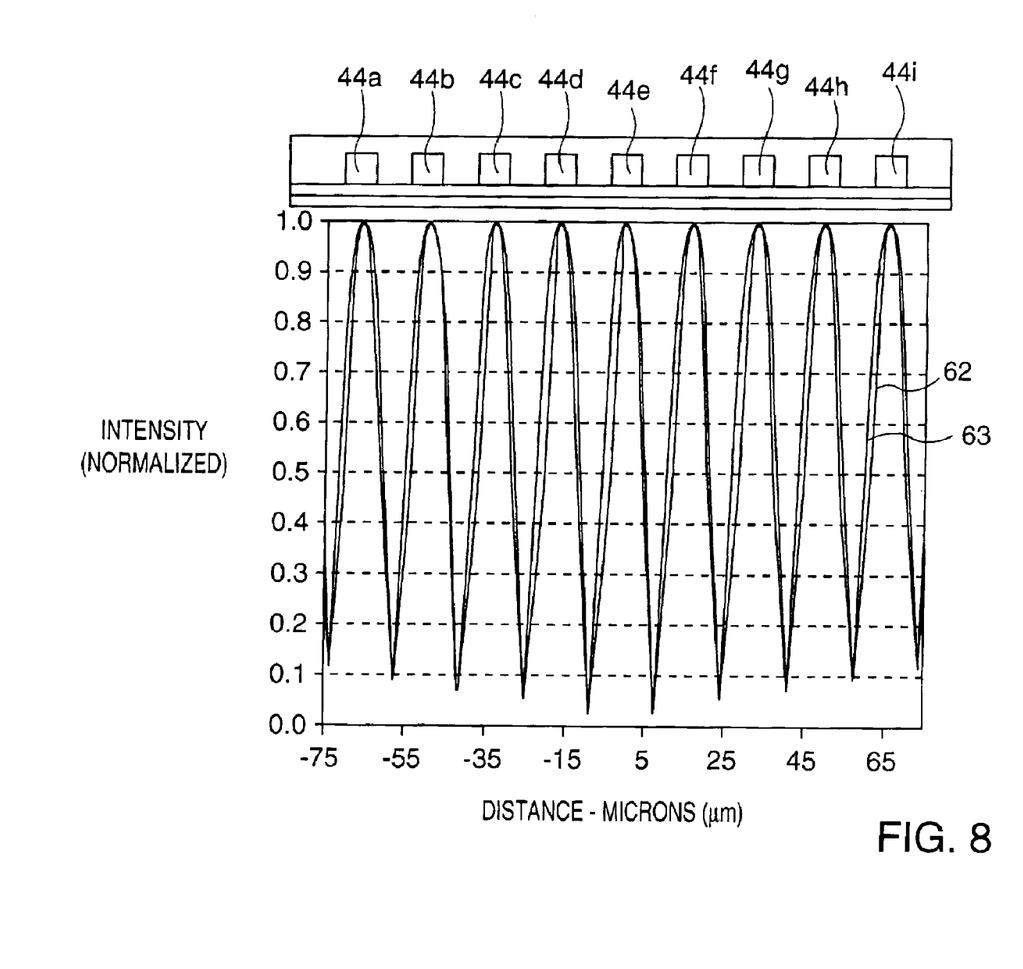
FIG. 8 shows enlarged mode profiles of the far field diffraction pattern of two coherent input signals with 10 degrees phase difference in a Free Propagating Region (FPR) and periodic mode profiles of arrayed output waveguides in the star coupler of FIG. 6 in accordance with the present invention.

Referring now to FIG. 8, there are shown an enlarged mode profiles 62 of the arrayed output waveguides 44a–44i in the star coupler 40 of FIG. 6, and a mode profile 63 of the far field diffraction pattern of two coherent input signals with a 10 degree phase error from input ports 32a and 32b in the Free Propagation Region (FPR) 42 in FIG. 6 in accordance with the present invention. FIG. 8 displays a same information to that shown in FIG. 4 for the conventional star coupler 10 of FIG. 1. The overlap between mode profiles 62 and 63 for the present star coupler 40 with two input ports 32a and 32b are larger than the overlap between mode profiles 20 and 24a–24i of FIG. 4. This shows that the current design is relatively insensitive to the phase fluctuations between two coherent input sources. Therefore, with the present planar star coupler 40 having two input ports 32a and 32b, there is an excellent match of the mode profiles shown in FIGS. 6 and 7, and lower loss is achieved from that found in the conventional start coupler 10 of FIG. 1.

The loss reduction can be exhibited by calculating the overlap integral for the mode profile (M) for the case where there is only one source (a conventional star coupler as shown in FIG. 1), and the overlapping integral where there are two separate waveguides (present star coupler shown in FIG. 6) using the following formula (1).

$$M=|\int E^1 E^{2*} ds|^2 + |\int E^1 E^{1*} ds \int E^2 E^{2*} ds| \qquad (1)$$

Table I shows the calculated mode profile overlap M for each case where W1=W2=5 $\mu m$, d=300 $\mu m$, t=16.5 $\mu m$, and R=5 mm.

TABLE I

|  | Mode Overlap (M) | Loss (dB) | Loss Reduction |
|---|---|---|---|
| Conventional Approach | 0.468 | 3.40 |  |
| Double Waveguide | 0.660 | 2.18 | 1.22 |
| Double Waveguide (10° phase error) | 0.657 | 2.20 | 1.30 |

From Table I it can be seen that the theoretical loss can be reduced by 1.22 dB (25%) using dual input waveguide ports 32a and 32b. There is also shown that if there is a 10 degree phase error between the signals in the two waveguide ports 32a and 32b, the loss reduction is changed by only 0.02 dB which indicates that the robustness of the present design.

It is to be appreciated and understood that the specific embodiments of the present invention described hereinabove are merely illustrative of the general principles of the present invention. Various modifications may be made by those skilled in the art which are consistent with the principles set forth. For example, for a better control over the output spectrum, the present invention can be implemented using more than two input waveguides. The dual, or multiple, modes at the input waveguide can also be obtained using a Long Period Grating (LPG) mode transformer, or any other method, to convert a single mode shape into a higher order mode such as a super-mode coupler having two or more adjacent waveguides. Still further, the present invention is not limited to the transmission of lightwave signals, and can be applied to, for example, the transmission of microwaves as in antennas, or multiplexers and demultiplexers.

What is claimed is:

1. A one-to-n signal coupler comprising:

a Free Propagation Region (FPR) comprising first and second opposing edge interfaces, the first edge interface defining at least two separated input ports thereon that terminate at least two separate waveguide subsections obtained from a single input waveguide, and the second edge interface defining an array of a plurality of n output ports thereon that provide inputs to a plurality of n output waveguides, respectively, where n is an integer greater than 1;

each of the n output ports being separated from each other and intersecting different areas of a portion of the second edge interface defining the FPR; and the at least two input ports intersect a portion of the first edge interface opposite the second edge interface and are separated by a predetermined distance from each other such that portions of an input signal launched into the FPR from each of the at least first and second input ports diffracts in the FPR to generate a high intensity signal at each of the n output ports and a low intensity signal elsewhere on the second edge interface.

2. The one-to-n signal coupler of claim 1 wherein the portions of the first and second edge interfaces, respectively, of the FPR comprise separate partial curved configurations which are separated by a predetermined distance.

3. The one-to-n signal coupler of claim 1 wherein the at least two input ports are located on the first edge interface of the FPR with a predetermined distance "d" between adjacent input ports.

4. The one-to-n signal coupler of claim 1 wherein the input waveguide and each of the plurality of n output waveguides are optical waveguides.

5. The one-to-n signal coupler of claim 4 wherein the FPR comprises a an optical slab waveguide.

6. A star coupler comprising:
a Free Propagation Region (FPR) comprising a first interface and a second opposing interface for guiding an input signal launched from the first interface in a predetermined first plane while allowing an input signal to travel unguided in a predetermined second plane in the FPR which is orthogonal to the first plane;
a plurality of n output waveguides formed in an array where each output waveguide terminates at a separate output port defined in the second interface of the FPR, an axis of each output waveguide port being separated from an axis of an adjacent output waveguide port by a predetermined distance "t"; and
an input waveguide that is split into a plurality of subsections where each waveguide subsection terminates at a separate input port defined in the first interface of the FPR, the input waveguide being arranged for simultaneously launching parts of the input signal into the FPR from the plurality of waveguide subsections that produce mode patterns at the second interface having a maximum intensity at the output waveguide port of each of the n output waveguides and having a low intensity elsewhere on the second interface.

7. The star coupler of claim 6 wherein:
the first interface of the FPR comprises a curved configuration; and
the second interface of the FPR comprises a curved configuration where the first and second interfaces have their central points separated by a distance "R".

8. The star coupler of claim 6 wherein the plurality of subsections of the input waveguide terminate at output ports thereof that are located on the first interface of the FPR with a predetermined distance "d" between adjacent output ports.

9. The star coupler of claim 6 wherein the input waveguide and the plurality of n output waveguides are optical waveguides.

10. The star coupler of claim 6 wherein the FPR comprises a slab waveguide including the first and second interfaces.

11. A planar star coupler comprising:
a Free Propagation Region (FPR) comprising a first interface and a second opposing interface for guiding an input signal launched from the first interface in a predetermined first plane while allowing the input signal to travel unguided in a predetermined second plane in the FPR which is orthogonal to the first plane;
a plurality of n output waveguides formed in an array which terminate at n spaced-apart output ports at the second interface of the FPR, the axis of a separate output port formed by each output waveguide at the second interface being separated from an axis of an adjacent output waveguide port by a predetermined distance "t"; and
an input waveguide that is split into at least first and second subsections which terminate in at least first and second input ports, respectively, at the first interface of the FPR, the input waveguide being arranged for simultaneously launching parts of the input signal into the PPR from the at least first and second subsections that produce mode patterns at the second interface having a maximum intensity at inputs of each of the output waveguides and having a low intensity elsewhere.

12. The planar star coupler of claim 11 wherein:
the first interface of the FPR comprises a curved configuration; and
the second interface of the FPR comprises a curved configuration where the centers of the first and second interfaces are separated by a predetermined distance.

13. The planar star coupler of claim 11 wherein the input ports of the at least first and second subsections terminate on the first interface of the FPR with a distance "d" therebetween.

14. The star coupler of claim 11 wherein the input waveguide and the plurality of n output waveguides are optical waveguides.

15. The star coupler of claim 14 wherein the FPR comprises a slab waveguide including the first and second interfaces.

16. A one-to-n coupler comprising:
a housing member having walls which enclose a Free Propagation Region (FPR) and define first and second input ports and n separated output ports, wherein:
the first and second input ports comprise at least two separated input waveguide channels which couple the first and second input ports to predetermined different areas of a first portion of the walls;
each of the n output ports are separated from each other and intersect different areas of a second portion of the walls; and
the first and second portions of the walls are located opposite each other such that, with a signal introduced at the first and second input ports, essentially signals enter the FPR from the at least two input waveguide channels and generate at each of the n output ports a high intensity signal and a low intensity signal elsewhere.

17. The one-to-n coupler of claim 16 wherein the first and second portions of the walls of the housing member enclosing the FPR comprise separate partial curved configurations which are separated by a predetermined distance.

18. The one-to-n coupler of claim 16 wherein the at least two input waveguide channels couple the first and second input ports to the FPR in the first portion of the walls of the housing member with a predetermined distance "d" between adjacent waveguide channels.

19. The one-to-n coupler of claim 16 wherein the input port and each of the plurality of n output ports are optical waveguides.

20. The one-to-n coupler of claim 16 wherein the FPR comprises a optical slab waveguide.

21. A method of transmitting a single input signal to n output ports in a star coupler comprising the steps of:
(a) concurrently transmitting portions of the single input signal from at least two input ports defined in a first wall portion of a Free Propagating Region (FPR) into the FPR of the star coupler;

(b) causing each of the portions of the input signal to diffract in the FPR such that each of the n output ports defined in a second opposing wall surface receives a high intensity signal and a low intensity signal is received elsewhere.

22. The method of claim 21 wherein in performing step (a), transmitting the portions of the single input signal from the at least two input ports which are located on a first portion of walls bounding the FPR and separated by a predetermined distance "d" between an adjacent input ports.

* * * * *